United States Patent
Weller

(10) Patent No.: US 6,662,211 B1
(45) Date of Patent: Dec. 9, 2003

(54) METHOD AND SYSTEM FOR PROVIDING CONFERENCING SERVICES IN A TELECOMMUNICATIONS SYSTEM

(75) Inventor: Franz Weller, Harwhich, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/545,070

(22) Filed: Apr. 7, 2000

(51) Int. Cl.$^7$ .............................................. G06F 15/16
(52) U.S. Cl. ....................... 709/204; 709/205; 709/231; 709/232; 370/260; 370/263; 370/264; 370/266; 370/267; 248/14.09; 379/202.01
(58) Field of Search ................................. 709/204–205, 709/231–232; 370/260–267; 348/14.09–14.1; 379/202.01

(56) References Cited

U.S. PATENT DOCUMENTS

| | | | |
|---|---|---|---|
| 4,475,190 A | | 10/1984 | Marouf et al. |
| 4,566,096 A | * | 1/1986 | Sarson et al. ............... 370/263 |
| 4,831,618 A | * | 5/1989 | Bruce .......................... 370/264 |
| 5,768,263 A | | 6/1998 | Tischler et al. |
| 5,883,945 A | | 3/1999 | Richardson, Jr. et al. |
| 6,288,739 B1 | * | 9/2001 | Hales et al. ................. 709/204 |
| 6,522,633 B1 | * | 2/2003 | Strawczynski .............. 370/260 |

* cited by examiner

Primary Examiner—Bharat Barot

(57) ABSTRACT

A method and apparatus for providing unified conferencing services in a telecommunications system is described. A DSP chip in the system contains an internal CPU and on-chip memory storage device. The CPU is programmed such that when a conference has been established, the time slots or channels of PCM information are collected and stored. Channels are sub-sampled at a pre-determined optimal time interval. The energy for each sub-sample, which is a mathematical summation over time utilizing a sum of squares equation, is calculated for each channel. These calculated energies are stored in an associated array. The energies are surveyed to select the N loudest channels. The input signals (the voice information) for those N loudest channels are used to form the conference. More specifically, the sum of the N loudest channels is generated. This sum forms the basis for a broadcast output. In the case of an individual participant who is not one of the N loudest, the broadcast output is written out in the correct PCM format to that conferee. In the case of an individual participant who is actually one of the N loudest, its own sample is subtracted from the total sum and the result is written out in the correct PCM format to the particular conferee. The broadcast outputs are also written out in required PCM formats for half-duplex listen-only connections to the conference.

14 Claims, 8 Drawing Sheets

METHOD AND SYSTEM FOR PROVIDING CONFERENCING SERVICES IN A TELECOMMUNICATIONS SYSTEM

BACKGROUND OF THE INVENTION

1. Field of the Invention

The present invention relates generally to the field of telecommunications and, more specifically, to a method and apparatus for providing unified conferencing services in an expandable telecommunications switching system.

2. Background Information

A competitive telecommunications system must be capable of providing a wide variety of telecommunications services. For example, subscribers may request services such as voice processing services, call waiting, caller identification and call forwarding. In the commercial context, one of the most desirable services is that of conferencing. Conferencing refers to the ability of three or more callers, each using a separate telephone set and often located at remote locations from each other, to participate in a single telephone call simultaneously. In addition, there is an ever-expanding need for conferencing services that can accommodate large conferences of, for example, ten to seventy or more participants. Moreover, the participants are often physically distributed worldwide. This means that the pulse code modulation (PCM) format pursuant to which the voice signals are encoded may differ between callers. In other words, some of the calls might be in the well known $\mu$-law PCM format commonly used in the United States, and other calls participating in the conference may be encoded in A-law format, used typically in Japan.

A further service that is often desirable in conferencing is that of a broadcast output. There are many commercial applications in which a one-way (half-duplex) operation is desired. For example, there may be a monitoring operator, such as a supervisor, listening in on a subordinate's telephone call with a customer. Alternatively, educational courses can be provided over the telephone and participants simply listen and do not have the opportunity to speak during this type of conference. The broadcast output supplies this type of one-way connection.

Originally, separate conferencing systems had interfaced with a conventional computer-controlled digital switching matrix within a Private Branch Exchange (PBX) switch or a public switching system that provided a circuit switching function. More recently, it has been known to provide conferencing within a high-speed digital communications network that includes a plurality of switching nodes with each node including its own nodal switch. This type of system is described in commonly-owned U.S. Pat. No. 5,920,546 (Hebert et al.) for a METHOD AND APPARATUS FOR CONFERENCING IN AN EXPANDABLE TELECOMMUNICATIONS SYSTEM, which is presently incorporated herein by reference in its entirety.

In accordance with that system, at least one node in the system (e.g., a conferencing node) contains a digital signal processing ("DSP") circuit capable of performing a conferencing operation on the voice information of the conferees. More specifically, the DSP circuitry executes a conferencing function on the voice information by operating on it using, for example, a conferencing algorithm that typically includes summing together the channels of voice information from each conferee. As is typical in the industry, after summing all of the voice data, the conference processor subtracts each conferee's data from the summed total intended for that conferee. This is done in order to minimize echo effects and improve system stability. The DSP circuit executes this conferencing function on the voice information and then outputs a different instance of conferenced voice information for each conferee. Each instance of conferenced voice information is then transmitted to the corresponding conferee.

More specifically, the DSP circuitry first places the instances of conferenced voice information on an internal bus located in the conferencing node. A data transmitter in the nodal switch that is preferably linked with the bus then receives the instances of conferenced voice information. Next, the conferencing node may formulate a packet or packets containing the instances of conferenced voice information for transmission via its data transmitter over the network. Specifically, each instance of conferenced voice data may be packetized, addressed and transmitted according to instructions from the system to the programmable switching node interfaced with the corresponding conference participants. Each programmable switching node, upon receipt of the packet or packets, then captures the instance of conferenced voice information ear marked for that participant via its own data receiver and switches the information to the participant.

This process may be repeated on a high-speed basis, however, there is a limit to the number of conferees that can be included in the conference. It can be difficult to form a very large conference with typically-employed conferencing algorithm mathematics because of the noise that is accumulated from every channel, which would then be summed and thus increased per additional participant. In addition, conference participants may tend to speak even louder and louder to overcome this noise and a limit to the loudness tolerated in the audio components of the system may be reached causing the conference output signal to be incomprehensible.

For example, the above-mentioned '546 patent generally handles conferences of up to about seven conferees. Despite its utility in forming a conference that has a high quality voice signal output, the conferencing technique described above does not fully allow for the further capacity to handle larger conferences. In addition, there is a further need for a conferencing system that can accommodate larger conferences and for such a system that is capable of operating on input signals from participants whose PCM-encoded data is in different formats. This need is particularly great with large conferences because it is even more likely that a conference of thirty or more will include participants from various parts of the world and thus, will involve PCM-encoded data which is in different formats. There also remains a need for a system for large conferences that includes the capability of providing a broadcast output.

SUMMARY OF THE INVENTION

It is therefore an object of the present invention to provide a method and apparatus for providing conferencing services for a large number of participants (in full duplex or half-duplex operations) that produces a high quality output signal, while accommodating participants having voice information in different PCM-encoding formats. It is a further object of the present invention to provide a conferencing system that is compatible with a high-speed, expandable telecommunications system. It is a further object of the invention to provide a conferencing system that can implement multiple distinct conferences simultaneously.

Briefly, the invention comprises a method and apparatus for providing conferencing services in a telecommunications system. A preferred embodiment of the invention operates within a high-speed telecommunications system comprised of multiple switching nodes connected by an inter-nodal network. At least one node in the system contains digital signal processing (DSP) circuitry capable of performing conferencing functions on the voice information from conferees connected to the system. Typically, many nodes will contain multiple DSP integrated circuits ("chips") in a DSP module. A DSP chip contains a microprocessor as well as memory storage devices. The microprocessor is programmed in accordance with the invention to provide the conferencing services. When a conference is being established, available conferencing resources are identified within a DSP chip in a node in the system, which is then the conferencing node. Pursuant to instructions from the system host, the voice information at each node interfaced with a conferee is addressed and transmitted to the conferencing node. The details of the routing of this information to the conferencing node are set forth in the previously incorporated, commonly-owned U.S. Pat. No. 5,920,546. Several conferences can be maintained at a time and conferences are dynamically set up and torn down by the system. Additionally, conferees can be dynamically inserted and removed from each conference.

A data receiver at the conferencing node captures the voice information from the incoming PCM time slots. The captured voice information is stored in an array within a high-speed memory storage device of the DSP chip for further computations.

Information is kept of the channels occurring in different conferences currently being maintained by each DSP chip. In accordance with the invention, the CPU of the DSP chip is programmed to search for the loudest channels, i.e., the greatest energy, for all channels in the array for a particular conference. Only those channels that contain the greatest energy within a certain time period are used by the DSP chip to form the conference.

A determination is previously made about the number of loudest channels to be selected. This number of channels is referred to herein as N. In a preferred embodiment, N set equal to 3. Specifically, the three loudest channels are selected and the voice information from those particular three channels is summed to form an instance of the conferenced information.

In addition, a determination is previously made about the time duration over which to estimate the energy in all channels. This time duration is herein referred to as T_energy. In a preferred embodiment, T_energy is set equal to 15 milliseconds.

A determination is previously made about the time interval over which to survey the individual channels to find those that contain the greatest energy. This preferred time interval is herein referred to T_survey. T_survey is greater than or equal to T_energy. As will be understood by those skilled in the art, a larger T_survey reduces the computational load of the DSP chip per unit time, but can decrease the perceived quality of the conference. In a preferred embodiment, T_survey is approximately equal to T_energy.

To determine those channels that are loudest, the CPU of the DSP chip is programmed to sub-sample the captured voice information, and to estimate the energy in each channel using the sub-sampled data. As will be understood by those skilled in the art, sub-sampling the data reduces the number of computations that must be performed by the CPU of the DSP chip over time, and thereby permits the DSP chip to service more channels at a time. In a preferred embodiment, the data for each channel is sub-sampled by a factor of four, resulting in a sub-sample rate of 0.5 microseconds for each channel. The energy of each channel is estimated using this sub-sampled data. In a preferred embodiment, the energy of each sub-sampled channel is computed via a mathematical summation over time utilizing a sum-of-squares equation. The computed energies are stored in an associated set of arrays within the high-speed memory storage device of the DSP chip.

For a particular conference, the channels of samples representing the loudest N parties are summed together in real-time. The sum forms the basis for a broadcast output for that conference, and is stored in an array in the high-speed memory of the DSP chip for future computations. This process is repeated for each conference on that DSP chip.

The broadcast conference output is used as a half-duplex conference output as described above. Data is compressed into the required PCM formats after summation. In the preferred embodiment of the expandable telecommunications system, both mu-law and A-law outputs are preferably generated for all conferences at all times. Thus, half-duplex outputs are available in both mu-law and A-law formats. Additionally, the sum is transmitted in the correct encoding format, as PCM data, to the conference participants that are not currently the N loudest.

In the case of a conferee that is actually one of the N loudest, that conferee's own sample is subtracted from the total sum that was stored before compression, and the result is compressed and written out in the correct PCM format to that particular conferee.

The list of the N loudest channels is updated at regular intervals (T-survey). When updating the list of N loudest, there is a search and replace function. If a new candidate is found to be louder than the current N loudest in the previous interval, then the new candidate becomes one of the N loudest.

In accordance with another aspect of the invention a new energy estimate is checked against the softest of the N loudest energy estimates to avoid having to check against all of the N loudest during every interval. If the new energy estimate is louder than the softest of the then N loudest, then the new channel becomes one of the new N loudest.

The energies of the channels are calculated at a selected rate. In addition, the N loudest sub-samples are updated at regular intervals.

Although the invention will be described herein with regard to an expandable telecommunication system, it should be understood that the invention may be used in connection with other conferencing systems that utilize DSP circuitry for signal processing.

BRIEF DESCRIPTION OF THE DRAWINGS

This invention is pointed out with particularity in the appended claims. The above and further advantages of the invention may be better understood by referring to the following description in conjunction with the accompanying drawings in which:

DETAILED DESCRIPTION OF AN ILLUSTRATIVE EMBODIMENT

Figure 1:
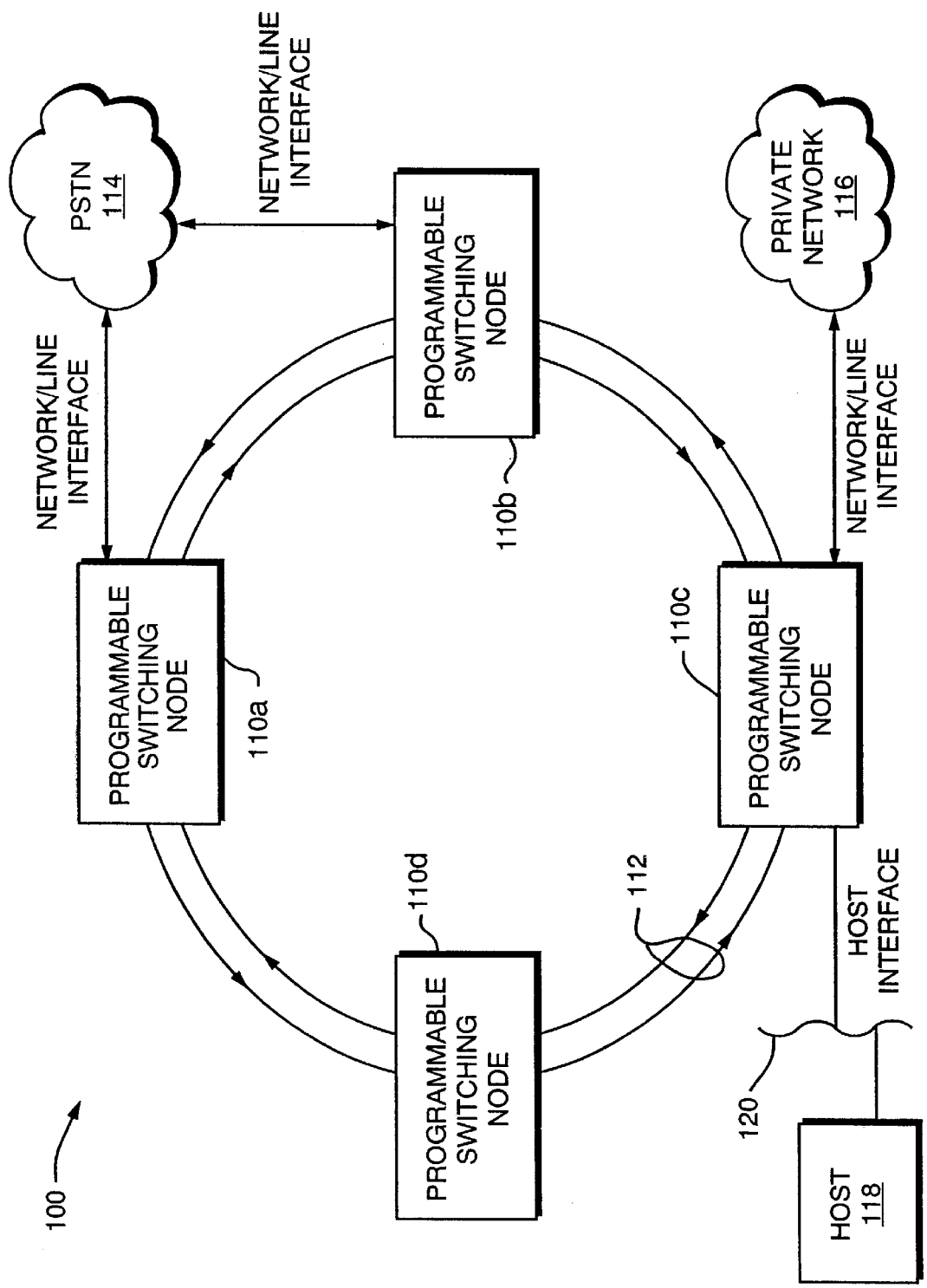
FIG. 1 is a highly schematic block diagram of an expandable telecommunications system employing a ring type inter-nodal network.

FIG. 1 shows a large capacity, expandable, fully programmable telecommunications switching system 100. Details of the construction and operation of system 100 may be found in U.S. Pat. Nos. 5,544,163 and 5,349,579, both of which are assigned to the assignee of the present invention. To aid in the understanding of the present invention, certain aspects of the system 100 are discussed here.

The system 100 includes a series of programmable switching nodes 110a–110d connected together by an inter-nodal network 112. The network 112 preferably supports high-speed, high-bandwidth digital communications between the nodes 110a–110d. The inter-nodal network 112 may be a ring-type network implemented using two rings, as shown in FIG. 1. The network 112 may also be implemented with any of a variety of other types of communication networks including Ethernet or other types of LANs, wireless communication networks, the PSTN (ATM/sonet), or the Internet.

As shown in FIG. 1, nodes 110a and 110b each include a digital network/line interface for connection with PSTN 114. Node 110c also includes a digital network/line interface and is connected to a private network 116. The term "private network" is intended in a broad sense to refer to any network or line or other interface other than the PSTN. The network/line interfaces of nodes 110a–110c terminate either digital networks or analog trunks/lines, or combinations of both types. It should be further understood that the network/line interfaces of any given node may include suitable interfaces for performing communications using ATM, signaling system 7 (SS7), ISDN T1/robbed bit, E1/CAS or other communication protocols. It should be further understood that one or more nodes may not include network/line interfaces. Such nodes may instead provide voice processing resources.

The overall operation of the system 100 is preferably controlled by a host 118, which may be implemented with a personal computer (PC) workstation, fault tolerant or other computer on which a user's application software runs. As shown, note 110c includes a host interface which is connected in communicating relationship by a local area network (LAN) 120 with the host 118. The host 118 and node 110c are thus able to exchange messages. The interconnection between the host 118 and the node 110c may be provided by Ethernet, asynchronous communication (RS/232) links or other communication links.

The host 118 also communicates with the other nodes 110a, 110b and 110d of the system 100 over the inter-nodal network 112. More specifically, the host 118 communicates with any node by passing messages first in node 110c which, in turn, places the message on the inter-nodal network 112 for delivery to the appropriate nodes. Further details of the operation of this aspect of the system may be found in the '579 patent which has been incorporated herein.

As described in more detail below, the host 118 may also establish conferences among three or more conferees who have access to the system 100.

Figure 2:
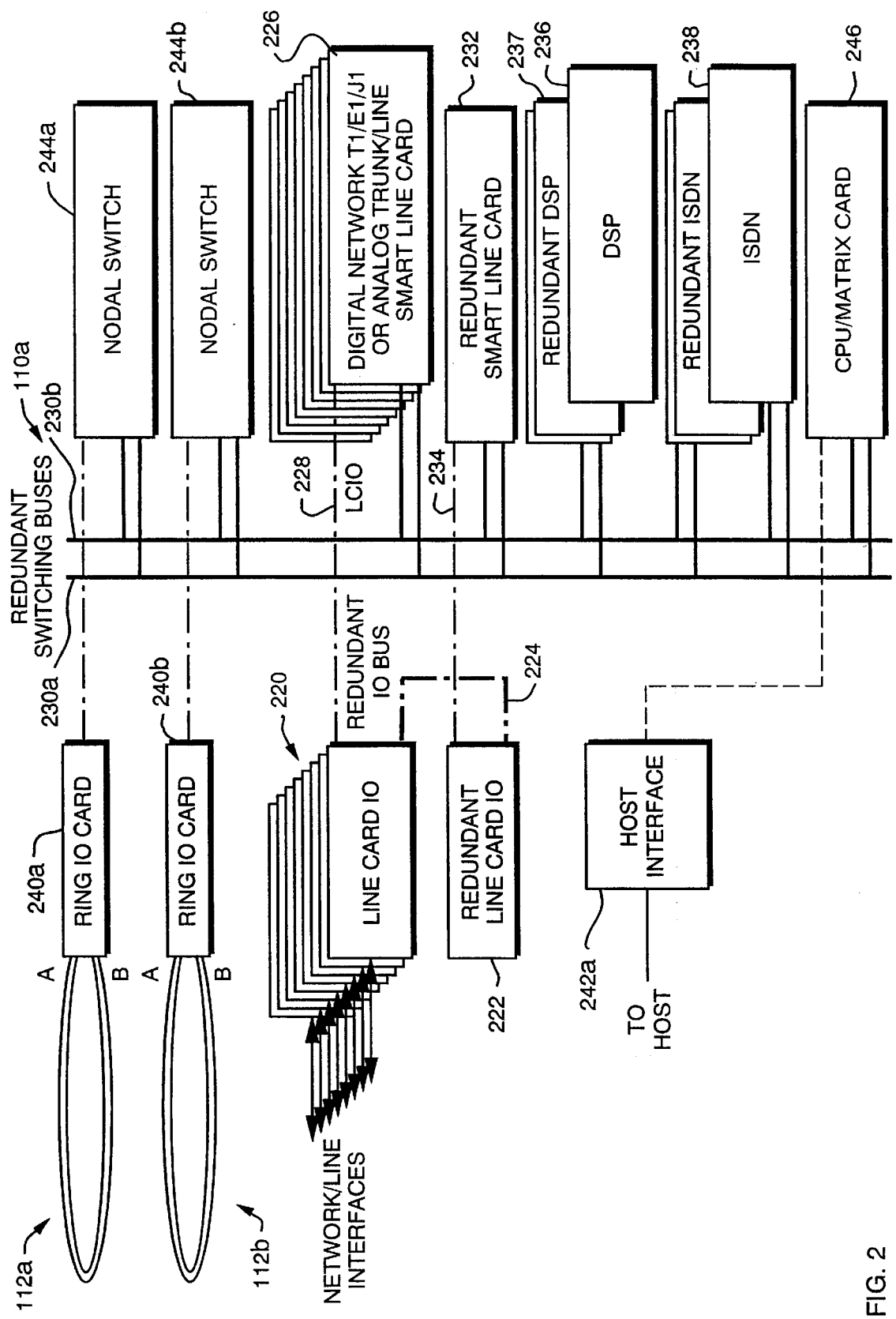
FIG. 2 is a highly schematic block diagram of a programmable switching node that may be used in the system of FIG. 1.

FIG. 2 shows the major functional components of a preferred embodiment of one type of programmable switching node 110a, which may be used in the system of FIG. 1. Digital or analog network/line interfaces are terminated on a series of line card input/output (IO) cards 220. In a preferred embodiment of the invention, network/line interfaces representing a total of 2,048 ports may be terminated by line card IO cards 220.

If desired, a redundant line card IO card 222 and redundant IO bus 224 may optionally be provided to permit continued operation of the switching node 110a in the event of a failure of one of the line card IO cards 220.

A series of digital network T1, E1, J1 or analog trunk/line line cards 226 communicate with the line card IO cards 220 over line card (LC) IO lines 228. Line cards 226 are also interfaced with redundant switching buses 230a and 230b. Again, if desired, an optional redundant line card 232 may be provided which communicates with redundant line IO card 222 over redundant line card IO lines 34. Other types of network/line interfaces such as DS3, SONET or others may also be provided.

The method of the present invention is preferably performed on DSP card 236, which may be paired with a redundant DSP card 237, if desired in the application. Other communication services such as tone detection, tone generation, voice recorded announcements, call progress analysis, speech recognition, ADPCM compression and many others can be provided as will be understood by those skilled in the art.

ISDN primary rate services and other packet communication services can be provided by ISDN card 238 and its redundant paired card.

An inter-nodal network IO card 240a serves an interface between the inter-nodal network 112 and a nodal switch 244a. A second inter-nodal network IO card 240b serves as an interface between an optional, second inter-nodal network 112b and an optional, second nodal switch 244b which preferably is in the same construction as the nodal switch 244a.

A CPU/matrix card 246 is interfaced with switching buses 230a and 230b and with the host interface 242a. The CPU/matrix card 246 is the primary control element for the overall switching node 110a and it includes the switching matrix whereby channels which may come into the node through the line card/IO cards 220 or from inter-nodal networks 112a or 112b, as well as instructions from the host, can be processed in that node 110a.

Figure 3:
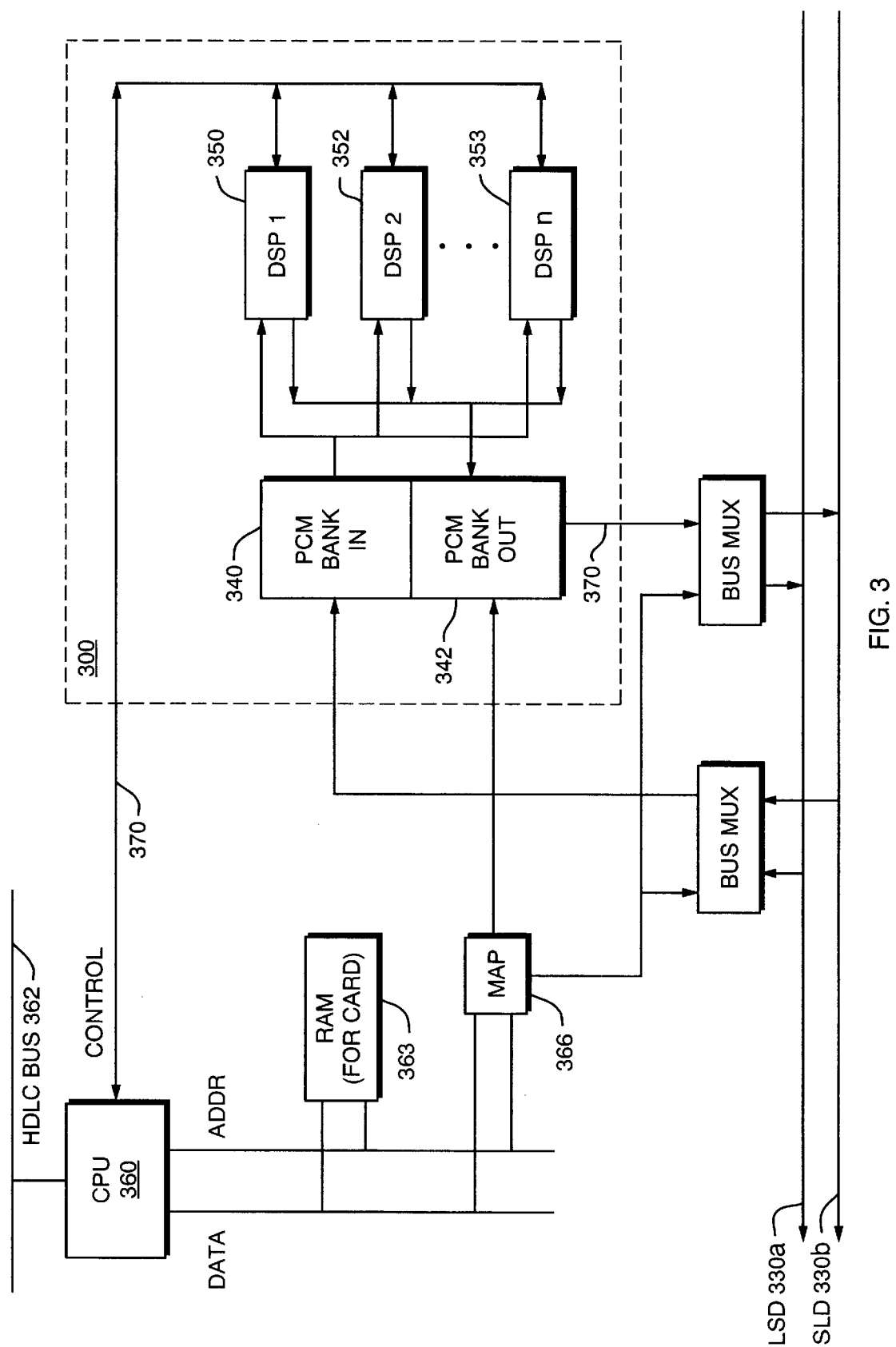
FIG. 3 is a highly schematic block diagram of a DSP card containing a DSP module that may be used in the programmable switching node of FIG. 2.

As stated herein, the conferencing services of the present invention are preferably performed in a DSP card 236. FIG. 3 shows one embodiment of a DSP card 236 (FIG. 2) which may be used in accordance with the method and apparatus of the present invention.

The DSP card 236 contains DSP module 300. The DSP module 300 has access to all of the time slots of PCM data coming into the system from the line cards/IO cards 220 (FIG. 2). The PCM data flows from a line card to the nodal switch, and to the DSP card 236 on the LSData, (LSD) bus 330*a* of FIG. 3. It travels to a PCM memory area on the card schematically shown in FIG. 3 as "PCM BANK IN" 340. The outgoing PCM data travels out of the "PCM BANK OUT" section 342 on the card onto the SLData (SLD) bus 330*b,* back out to the nodal switch, or over the inter-nodal network to another node served by the system.

The DSP module 300 contains multiple DSP chips such as those illustrated as DSP chips 350, 352, 353 in FIG. 3. The DSP chips 350, 352 and 353 communicate with the CPU over an internal bus 370 (with associated bus multiplexer 375). Each DSP chip, such as chip the 350, can provide many telecommunications services. In addition, the DSP circuitry is capable of conferencing voice information for conferences established in the system 100.

The overall operation of the DSP card 236 is controlled by its CPU 360, which may have an associated RAM 363. The CPU 360 communicates with the CPUs in other components in the node as well as with the system host 118 via a high-level data link (HDLC) control bus 362. The CPU 360 receives messages containing instructions about conferences to be set up, and it then routes the voice information from the appropriate PCM time slots in PCM BANK IN 340 to one of the DSP chips, such as the chip 350. The chip 350 performs a conferencing algorithm and operates on the voice information to produce conferenced outputs. Those outputs can be placed on internal bus 370 and travel to the SLD bus 330*b* and ultimately to the intended destination via the appropriate time slot.

Figure 4:
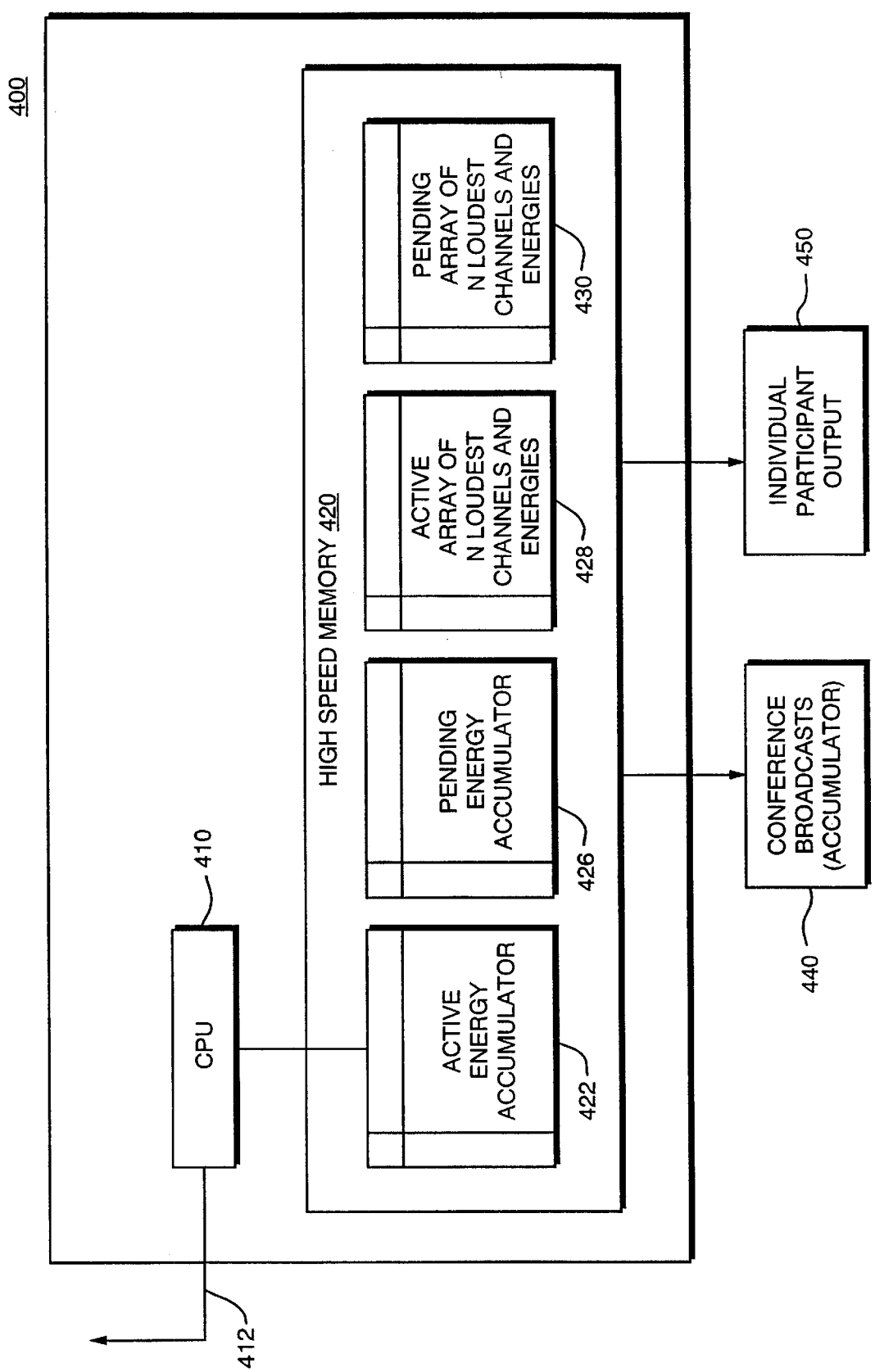
FIG. 4 is a highly schematic block diagram of a DSP chip of the DSP module of FIG. 3.

The major functional components of a DSP chip, such as the DSP chip 350, are illustrated in FIG. 4. A DSP chip 400 illustrated in FIG. 4 has its own internal CPU 410. The CPU 410 receives instructions from the main CPU 360 on the DSP card (FIG. 3) on which the DSP chip 400 is physically located. This is schematically illustrated in FIG. 4 with control input 412. The DSP chip 400 also includes a high-speed memory 420.

The high speed memory 420 is preferably divided into several arrays. In a preferred embodiment, illustrated in FIG. 4, two of the arrays are used in relation to calculation of the energy of incoming sub-samples. More particularly, the high-speed memory 420 has a first energy accumulator 422 and a second energy accumulator 426. At a given instant in time, one of the accumulators is an active accumulator and the other is a pending accumulator, as discussed in further detail hereinafter. In addition, high-speed memory 420 includes a first array of the N loudest channels and energies 428 and a second array of the N loudest channels and energies 430. The outputs of the DSP chip 400 are schematically illustrated as conference broadcast (accumulators) 440 and individual participant outputs 450.

Figure 5:
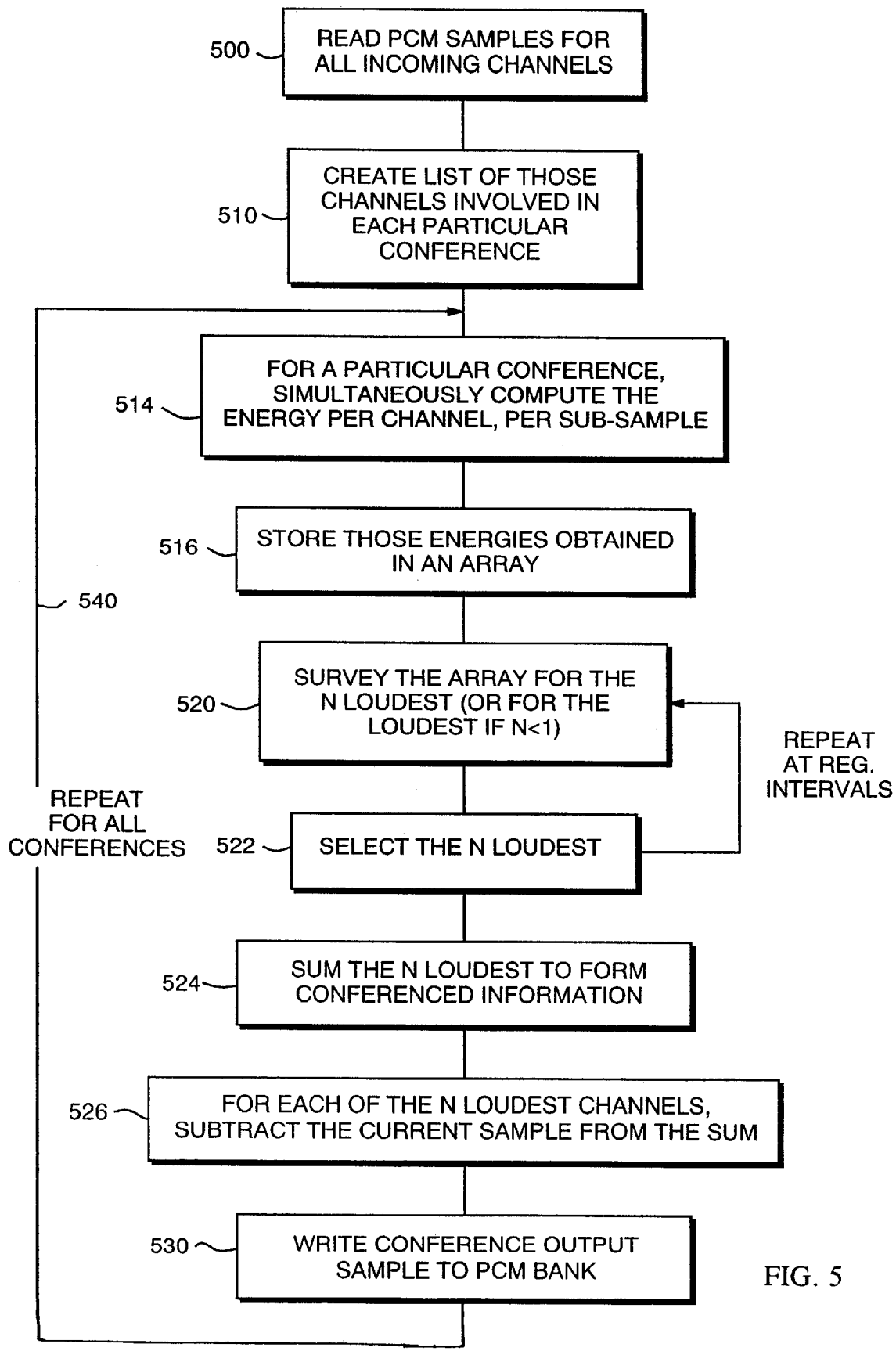
FIG. 5 is a flow chart of the steps to be followed in accordance with the method of the present invention.

The method of the present invention will be described with reference to the flow chart of FIG. 5, and with further reference to FIG. 4. As shown in step 500 of FIG. 5, the PCM samples for all incoming channels to that DSP chip are read. More specifically, the DSP card has access to all PCM time slots travelling on the LSD bus 330*b*. The time slots can be stored in the PCM BANK IN 340 (FIG. 3). These time slots (channels) are sub-sampled to form the energy estimates for all channels. For example, a first portion of the samples can be checked, i.e., such as the first 50 channels. Then, the second 50 channels are checked and so on. In accordance with the present invention, the sub-sampling may occur at about 0.5 microsecond intervals. As is well understood by those skilled in the art, the PCM samples are obtained at 0.125 microsecond intervals. Thus, the sub-sampling is performed at a slower rate to allow for the software calculations, but the sub-sampling will be rapid enough to allow for good sound quality.

As indicated in step 510, a list is created of the channels that are represent in each particular conference. This information is available from the host and is communicated to CPU 410 of the DSP chip 400 (FIG. 4). For each particular conference occurring at an instant in time, step 514 indicates that the system simultaneously computes the energy of the sub-samples of each channel involved in the conference. This calculation is made using a sum of squares mathematical equation, as will be understood by those skilled in the art. The energies obtained are alternatively stored in one of the two arrays which are shown in FIG. 4.

The energy values will alternatively be stored in either energy accumulator 422 or energy accumulator 426. At a given point in time, one of the two energy accumulators is the active array and the other is the pending array. For example, energy accumulator 422 is shown in FIG. 4 as the active energy accumulator. This array holds the calculated energies for each channel in a particular conference. Energy accumulator 426 is the pending energy accumulator. In the pending energy accumulator, the sum of squares calculation indicated in step 514 in being performed. The energies thus calculated are stored in that array 426 and it then becomes the active array. In the meantime, new sub-samples are sent to accumulator 422 and energies are then being calculated. Thus, array 422 is then the pending array. The CPU switches back and further between the two arrays in a ping-pong like fashion to allow the energies to be substantially continuously updated.

In a similar manner, the N loudest channels are updated. As shown in step 520, the active array (energy accumulator) is surveyed for the N loudest channels (or for the single loudest, if N=1). In accordance with step 522, the N loudest are then selected. Those N loudest are then stored in one of the two arrays of N loudest channels and energies 428 and 430 (FIG. 4). The N loudest channels indicated in the Active Array 428 are summed to form conferenced information, as indicated in step 524. While this sum is being produced the array 430 in which the energy survey is being performed is the pending array. Accordingly, the array in which the energy survey has already been produced is the active array such as the array 428. As illustrated in step 526, for each of the N loudest channels, the current sample is subtracted from the sum to produce the output 450 that is transmitted to individual participants that are currently the N loudest. As shown in step 528, the conference output sample 440 is also written to the PCM bank.

As shown by loop back 540, the step of simultaneously computing the energy per channel per sub-sample and surveying that for the N loudest is repeated for all conferences at regular intervals. Thus, this information is regularly refreshed. The rate of which the N loudest are updated is variable and its variation can be optimized for sound quality. The rate at which the energies are calculated can also be varied. Both of these variables can be adjusted to optimize for sound quality versus performance requirements on the software. If the energy calculations are performed too slowly, the sound quality can be degraded. With respect to the N loudest, the greater the number of loudest channels selected, the better the sound quality of the output of the conference. The lesser the number of loudest channels used, the more conferees can be included in the conference. Adjustments to the system can be made to suit a customer's requirements. For example, if a customer desires very large conferences, then N can be set equal to one. If a customer prefers better sound quality, but provides conferences to smaller groups, such as 30 participants or less, then N will be set equal to two or three. In addition, to further improve sound quality, the energy calculations might be performed more rapidly.

Figure 6A:
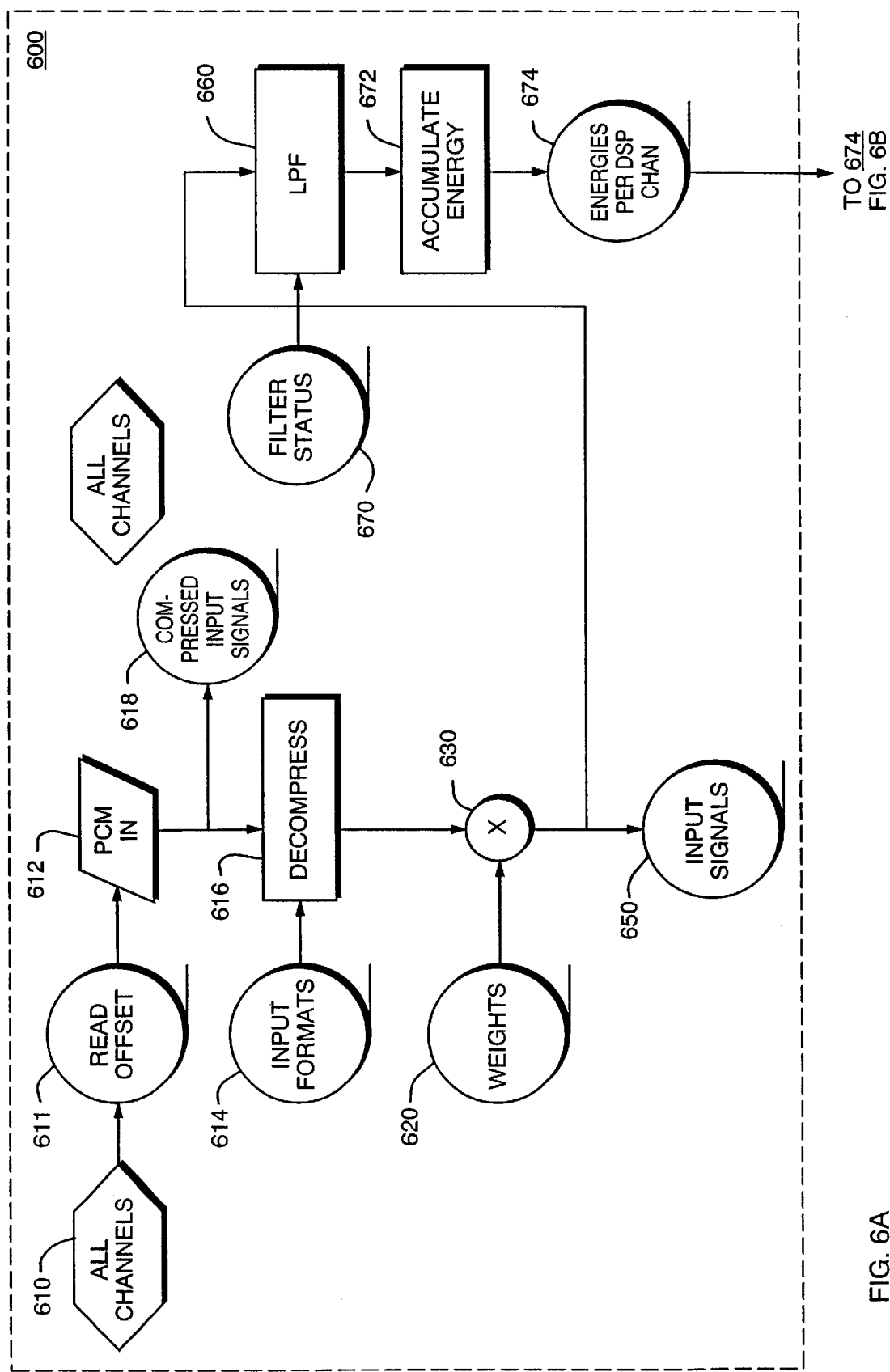
FIG. 6A is a highly schematic block diagram illustrating the operation of the method and apparatus of the system of the present invention, and in particular in relation to obtaining the input signals and energies.
Figure 6B:
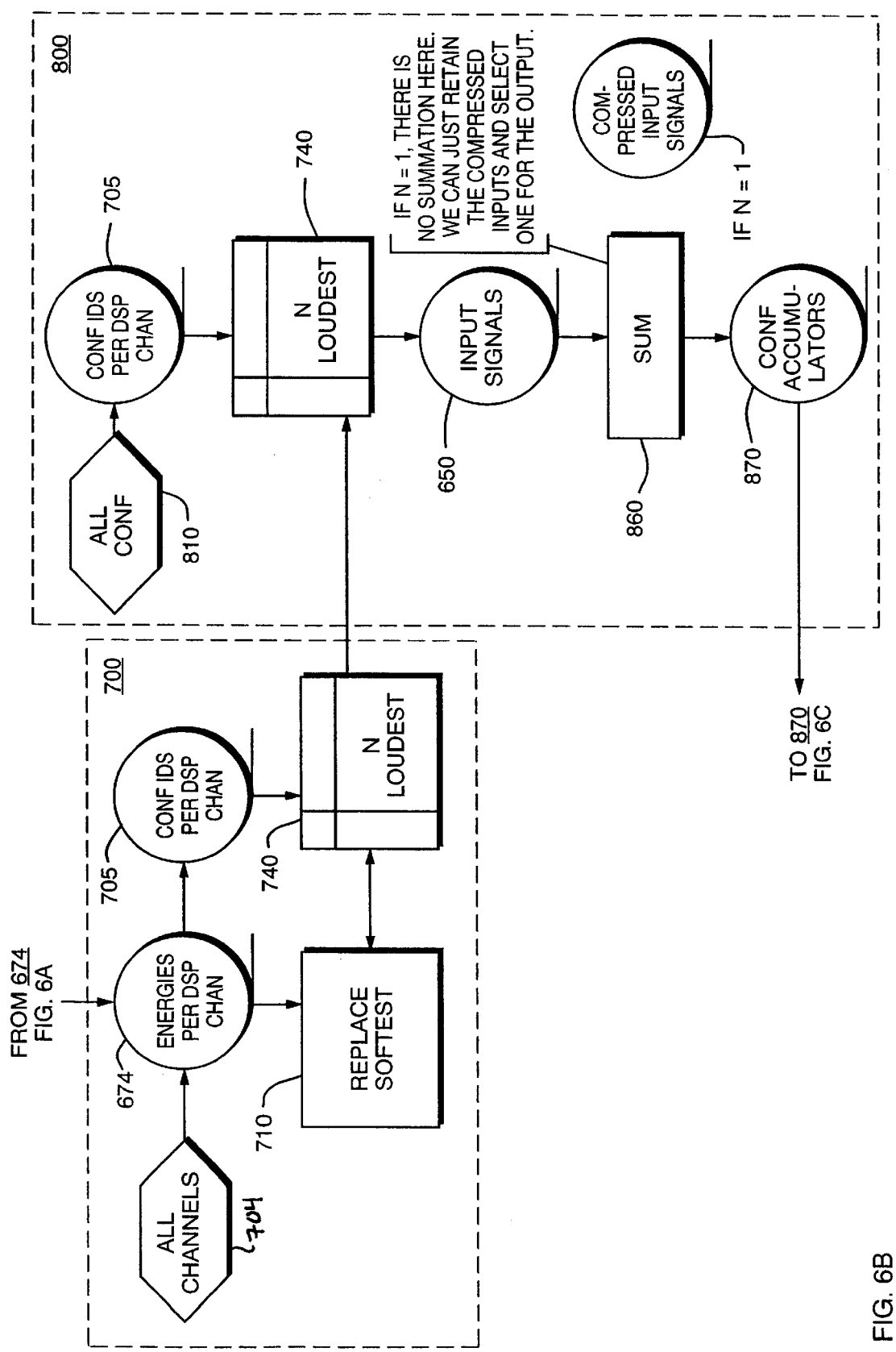
FIG. 6B is a highly schematic block diagram illustrating the operation of the method and apparatus of the system of the present invention, and in particular in relation to updating and summing the N loudest channels.
Figure 6C:
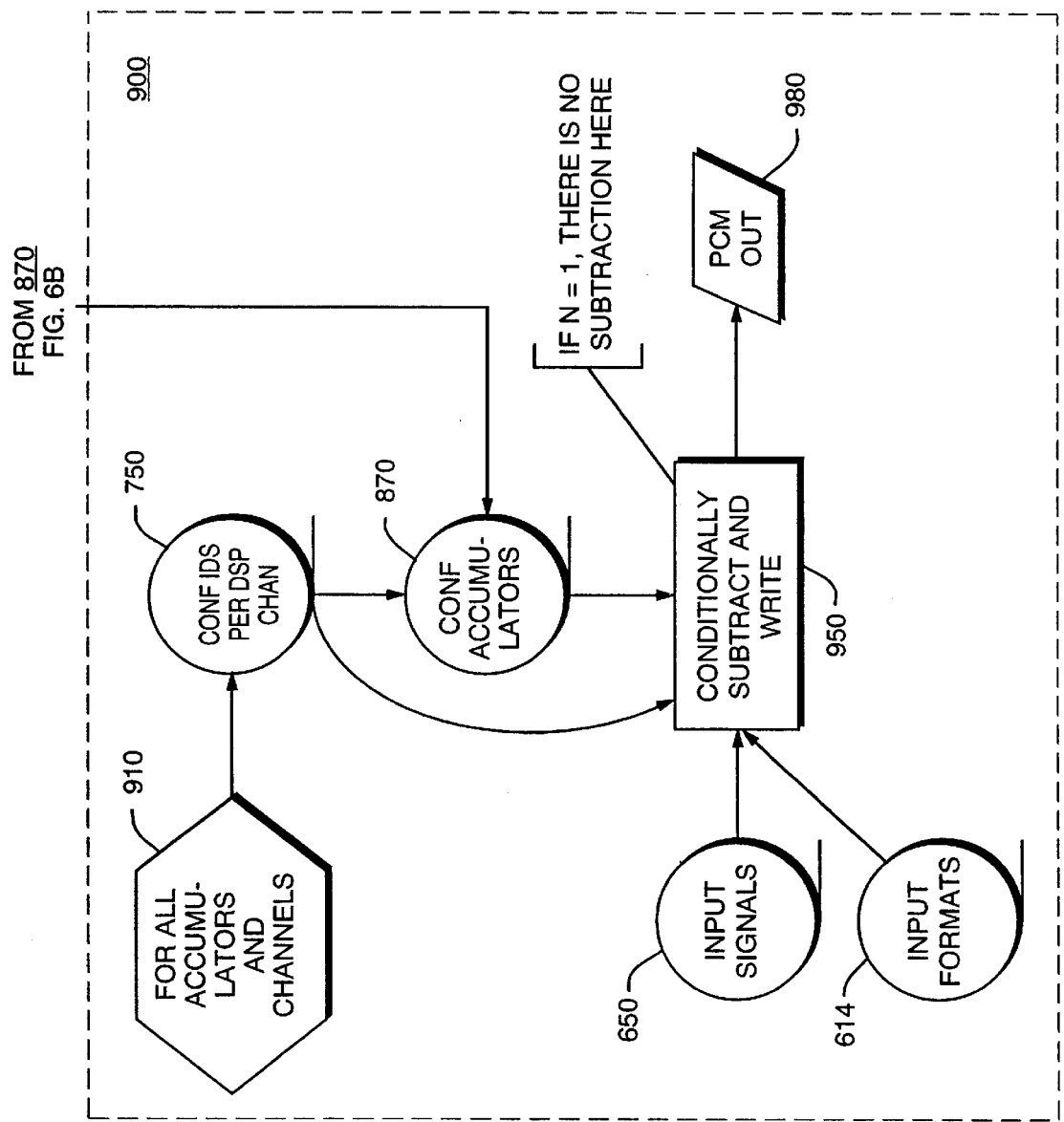
FIG. 6C is a highly schematic block diagram illustrating the operation of the method and apparatus of the system of the present invention, and in particular in relation to producing the conferenced output.

The operation of the method and apparatus of the present invention can be further understood with reference to the data and control flow diagrams of FIGS. 6A, 6B and 6C. In those figures, the major functional steps of the method of the present invention are shown in individual dashed blocks. Within each block, the data, which is manipulated in the individual steps of that function, is schematically illustrated, as are the functional components that carry out the data manipulation. In the figure, like data and/or components are assigned like reference numerals, even where such data or components also appear in another dashed block representing a different function.

The initial functional step is the retrieval of PCM time slots for all channels coming in to the DSP chip, and the calculation of the energies for each channel in that DSP chip. In initial block 600 of FIG. 6A, all channels 610 of time slots are scanned from PCM IN memory portion 612. The input format (A-law or mu-law) 614 is identified for each channel. The PCM-encoded voice data is decompressed accordingly as schematically illustrated in block 616. Compressed input signals are saved separately, as shown in component 618, for the case of N=1 as discussed hereinafter.

Depending upon the encoding format as well as other signal processing parameters, weighted adjustments are made to certain of the signals to equalize signal strength, as is understood by those skilled in the art. The weights as schematically indicated in component 620 and the function is schematically illustrated by multiplier 630. This produces decompressed input signals 650. The input signals are saved for later use in forming the conference.

In the meantime, the input signal data for all channels may be filtered to remove noise as shown in low pass filter 660 that has appropriate filter states 670. In accordance with the invention, the energies are calculated and accumulated 672 for each of the channels. The energies per DSP channel are illustrated by reference numeral 674. As discussed with reference to FIG. 4, this calculation occurs in the pending array of the high-speed memory 420 of the DSP chip. The computed energies per channel are maintained in the active array and are ready to be surveyed for determination of the N loudest.

Dashed block 700 of FIG. 6B illustrates the selection of the N loudest channels. For all channels 704, conference identifications per DSP channel are also kept in order to keep track of current conferences, as shown in component 705. The energies per channel 674 previously calculated for each conference are surveyed to determine whether a new channel should become one of the N loudest. In a preferred embodiment of the invention, the softest, or least loud, of the current N loudest is identified. This is referred to herein as the softest channel, and this information is maintained as illustrated in block 710. The energies per DSP channel 674 are checked to determine whether any of those energies are louder than the current softest channel. If so, the softest is replaced with the new current sample and is stored in the N loudest array as shown in component 740. In addition, in accordance with another embodiment of the invention, the system can learn to bias the conferees who are loudest. Accordingly, those channels can either be kept as the N loudest for a longer period of time or, alternatively, such channels can be blocked out and other channels given an opportunity to participate.

The formation of the conferenced information which is the basis of the conference output is illustrated in dashed block 800 of FIG. 6B. As noted with reference to block 700, for all conferences 810, the conference identifications per DSP channel are maintained (705) and the N loudest array is dynamically updated. Once the N loudest are identified (740), the input signals (650) for those particular channels are taken and summed as illustrated by component 860. If N=1, there is no summation and the compressed input signal 850 can simply be retrieved and used to form the conferenced output. For N>1, the sum of the input signals 650 are stored in the conference accumulators (870).

Referring to block 900 of FIG. 6C, this illustrates the formation of the conferenced broadcast output and the output to the individual participants. For all accumulators and channels 910, with the identification of each conference 750, the results in the conference accumulators 870 are used to form the outputs. For N>1, the input signals 650 for the N loudest channels have already been summed, the input PCM-encoding format is used to encode the summed signal, and the result is written to PCM OUT 980 to all individual conference participants who are not among the N loudest. For the participants in the conference who is the N loudest at that instant in time, the input signals are selected and the input formats are identified. Using the result of the sum in the conference accumulator 870, the input signal 650 of a particular N loudest participant is subtracted 950 from the sum. For that particular N loudest participant, the input format is utilized to compress the data and this is written to PCM OUT 980. Furthermore, as noted herein, the conference accumulators are also compressed the mu-law and A-law formats and written out to the PCM OUT for half-duplex participants.

The invention described thus provides a method and apparatus for providing conferencing services for a large number of participants (in full duplex or half-duplex operations). The output is available in either A-law or mu-law encoding. Multiple distinct conferences may be handled simultaneously. While a preferred embodiment of the invention has been described with reference to a particular expandable telecommunications system, it should be understood that the conferencing method described is equally applicable and readily adaptable to other types of telecommunications systems.

While the invention has been particularly shown and described with reference to preferred embodiments thereof, it will be understood by those skilled in the art that various changes in form and details may be made therein without departing from the spirit and scope of the invention. Furthermore, the terms of expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method of forming a conference in a telecommunications system, which system has multiple nodes connected by an inter-nodal network, each node being connected to ports for receiving incoming channels of voice information to be switched by the telecommunications system, and at least one of said nodes being a conferencing node which contains one or more digital signal processors (DSPs) the method including the steps of:

a. storing the incoming samples of voice information;

b. identifying which samples are assigned to a particular conference set up by the system;

c. accumulating the samples, which are destined for a particular conference in an accumulator in a high-speed memory component of an associated DSP;

d. calculating the energy of each channel to obtain an energy value;

e. storing said energies in said accumulator in said DSP;

f. surveying said accumulated energies for the N loudest channels to identify the N loudest channels at that instance;

g. summing the N loudest channels of voice information to produce a conference broadcast output;

h. subtracting each N loudest channel of voice information from said sum and writing the result as a conferenced output sample to each participant who is one of the N loudest channels;

i. writing said sum out to all non-N loudest channels as a conferenced output sample; and j. writing said sum out for any half-duplex conference participants.

2. The method as defined in claim 1 including the further step of: assigning, in said high speed memory component, a first and second energy accumulator array, and switching back and forth between said first and second energy accumulator array in such a manner that as energies being currently calculated by one of said first and second energy accumulator array, the other array stores completed calculations to be surveyed for the N loudest channels.

3. The method as defined in claim 1 including the further step of: assigning, in said high speed memory component, a first and second N loudest array, and switching back and forth between said first and second N loudest array in such a manner that as the N loudest channels are being currently updated and stored in one of said first and second N loudest arrays, the other array has completed calculations to be surveyed for the N loudest channels.

4. The method of forming a conference in a telecommunications system as defined in claim 1, including the further step of:

re-encoding each said conferenced output sample into the PCM encoding format, being A-law or mu-law, of the incoming channels of voice information for that conferee.

5. The method of forming a conference in a telecommunications system as defined in claim 1, including the further step of:

transmitting said conference broadcast output to half-duplex participants in a listen-only mode of operation.

6. The method of forming a conference in a telecommunications system as defined in claim 1, including the further step of selecting a conference participant and determining that said selected participant will receive special processing.

7. A telecommunication system for performing a conference, the system including nodes, said nodes having DSP chips with resources to perform a conferencing function, comprising:

a. a PCM receiver for receiving incoming channels of PCM data;

b. a processor associated with said PCM receiver programmed to identify those channels of PCM data involved in the particular conferences being handled by the system in that instance, and for each conference, said processor calculates the energies associated with each channel;

c. accumulator means for accumulating and storing the calculated energies of the information from each channel;

d. memory storage device for storing said calculated energies;

e. said processor being coupled to said memory storage device and being further programmed to survey said calculated energies at a regular interval and to select a predetermined number of loudest channels at a predetermined rate;

f. second accumulator for accumulating the identity of the N loudest channels and including a second memory storage device having an active array of N loudest channels; and g. means for performing the conference by summing the current N loudest channels and writing out conferenced information to the conferees.

8. A method of providing a conference in an expandable telecommunication system among two or more conferees represented by a plurality of incoming channels of sampled voice information, the method including the steps of:

a. storing samples of voice information in an associated memory storage array;

b. processing said samples to determine the N conferees which are loudest wherein N is greater than or equal to one;

c. retrieving from said memory storage array, the samples corresponding to those N loudest conferees;

d. processing said retrieved samples, including summing said retrieved samples using a conferencing algorithm to produce a conferenced output sample; and e. transmitting a conferenced output sample to at least one conferee.

9. The method of providing a conference as defined in claim 8 including selecting the integer 3 as the value of N.

10. A method of providing a conference in an expandable telecommunication system among two or more conferees represented by a plurality of incoming channels of sampled voice information, the method including the steps of:

a. storing samples of voice information in an associated memory storage array;

b. obtaining sub-samples from samples of voice information for each of the conferees;

c. performing a mathematical calculation on the sub-samples to determine an energy value for each channel for a particular conference;

d. placing said calculated energies corresponding to each channel for said particular conference in an energy accumulator;

e. surveying said energies to select the N greatest energies corresponding to the N loudest channels, and storing samples corresponding to said N loudest conferees;

f. retrieving from memory storage, the samples corresponding to those N loudest conferees;

g. processing said retrieved samples using a conferencing algorithm to produce a conferenced output sample; and h. transmitting a conferenced output sample to at least one conferee.

11. The method of providing a conference as defined in claim 10 including the further step of updating the selection of the N loudest channels at regular intervals.

12. The method of providing a conference as defined in claim 11 including the further step of scanning at said regular intervals, the N loudest energy estimates and checking each new energy estimate against the softest of the N loudest energy estimates, and replacing said softest energy estimate with said new energy estimate if said new sample is louder than the softest of the N loudest.

13. The method of providing a conference as defined in claim 10 including setting N equal to 1.

14. The method of providing a conference as defined in claim 10 including the further step of employing a sum of squares calculation as said mathematical calculation to determine said energy of each said sub-sample.

* * * * *